(12) United States Patent
Delano et al.

(10) Patent No.: US 11,389,747 B2
(45) Date of Patent: Jul. 19, 2022

(54) CHROMATOGRAPHIC FILTER

(71) Applicant: Waters Technologies Corporation, Milford, MA (US)

(72) Inventors: Mathew H. Delano, Allston, MA (US); Jonathan Belanger, Whitinsville, MA (US); Raymond P. Fisk, Norton, MA (US)

(73) Assignee: WATERS TECHNOLOGIES CORPORATION, Milford, MA (US)

( * ) Notice: Subject to any disclaimer, the term of this patent is extended or adjusted under 35 U.S.C. 154(b) by 1456 days.

(21) Appl. No.: 14/896,135

(22) PCT Filed: Jun. 6, 2014

(86) PCT No.: PCT/US2014/041274
§ 371 (c)(1),
(2) Date: Dec. 4, 2015

(87) PCT Pub. No.: WO2014/197783
PCT Pub. Date: Dec. 11, 2014

(65) Prior Publication Data
US 2016/0114262 A1    Apr. 28, 2016

Related U.S. Application Data

(60) Provisional application No. 61/832,177, filed on Jun. 7, 2013.

(51) Int. Cl.
*B01D 15/10* (2006.01)
*B01D 15/22* (2006.01)
(Continued)

(52) U.S. Cl.
CPC ............ *B01D 15/10* (2013.01); *B01D 27/08* (2013.01); *B01D 29/002* (2013.01); *B01D 35/02* (2013.01);
(Continued)

(58) Field of Classification Search
CPC ........ B01D 15/10; B01D 27/00; B01D 27/08; B01D 35/02; B01D 29/002; B01D 35/04;
(Continued)

(56) References Cited

U.S. PATENT DOCUMENTS 3,511,377 A    5/1970   Hrdina
4,313,828 A *  2/1982   Brownlee .............. B01D 15/08
                                                    210/198.2
(Continued)

FOREIGN PATENT DOCUMENTS

CN    86103166 A    11/1986
CN    101013116 A    8/2007
(Continued)

OTHER PUBLICATIONS

International Patent Application No. PCT/US2014/041274, International Search Report and the Written Opinion of the International Searching Authority dated Oct. 27, 2014, 9 pages.
(Continued)

*Primary Examiner* — Magali P Slawski
*Assistant Examiner* — Angel Olivera
(74) *Attorney, Agent, or Firm* — Schmeiser, Olsen & Watts LLP

(57) ABSTRACT

The invention provides filters and methods of assembling filters. In an exemplary embodiment, the filter includes a porous element, a compression element, and a housing. The compression element can be configured to receive the porous element, thereby forming an assembly. For example, the compression element can receive the porous element in a slip-fit relationship. The housing can have an opening formed therein that is configured to receive the assembly. In some embodiments, the assembly can be retained within the opening when the assembly is received therein. For example, the opening can receive the assembly in a press-fit relationship.

18 Claims, 13 Drawing Sheets

(51) Int. Cl.
  *B01D 29/00* (2006.01)
  *B01D 35/02* (2006.01)
  *B01D 35/04* (2006.01)
  *G01N 30/60* (2006.01)
  *B01D 27/08* (2006.01)
  *B01D 27/00* (2006.01)

(52) U.S. Cl.
  CPC ....... *G01N 30/603* (2013.01); *G01N 30/6004* (2013.01); *B01D 15/22* (2013.01); *B01D 27/00* (2013.01); *B01D 35/04* (2013.01); *G01N 30/6026* (2013.01); *G01N 30/6039* (2013.01); *G01N 30/6047* (2013.01)

(58) Field of Classification Search
  CPC .. B01D 15/22; G01N 30/6004; G01N 30/603; G01N 30/6039; G01N 30/6026; G01N 30/6047
  See application file for complete search history.

(56) References Cited

U.S. PATENT DOCUMENTS

| | | | |
|---|---|---|---|
| 4,545,904 A | 10/1985 | Tehrani et al. | |
| 4,759,843 A * | 7/1988 | Allington | B01D 15/22 210/198.2 |
| 4,876,005 A | 10/1989 | America | |
| 5,193,703 A | 3/1993 | Staats, III et al. | |
| 7,101,477 B1 | 9/2006 | Willis et al. | |
| 2005/0224414 A1 | 10/2005 | Izzo et al. | |
| 2007/0175809 A1 | 8/2007 | Cao et al. | |
| 2007/0295663 A1 * | 12/2007 | Iraneta | G01N 30/603 210/656 |
| 2008/0029449 A1 * | 2/2008 | Dewaele | G01N 30/603 210/232 |
| 2009/0056541 A1 | 3/2009 | Davison et al. | |
| 2011/0094953 A1 * | 4/2011 | Doehren | G01N 30/6026 210/198.2 |
| 2011/0259827 A1 * | 10/2011 | Belanger | G01N 30/08 210/656 |

FOREIGN PATENT DOCUMENTS

| | | |
|---|---|---|
| CN | 101495206 A | 7/2009 |
| EP | 1750125 A1 | 2/2007 |
| WO | 2008/121453 A2 | 10/2008 |
| WO | 2013/024345 A1 | 2/2013 |
| WO | 2014/197783 A1 | 12/2014 |

OTHER PUBLICATIONS

European Patent Application No. 14807277.0, Extended European Search Report dated Feb. 7, 2017, 9 pages.
"Operation Instructions, Models 7315 and 7335 Column Inlet Filters," Rheodyne LLC, Jul. 17, 2008.
Examination Report in European Patent Application No. 14807277.0 dated Apr. 12, 2021.

* cited by examiner

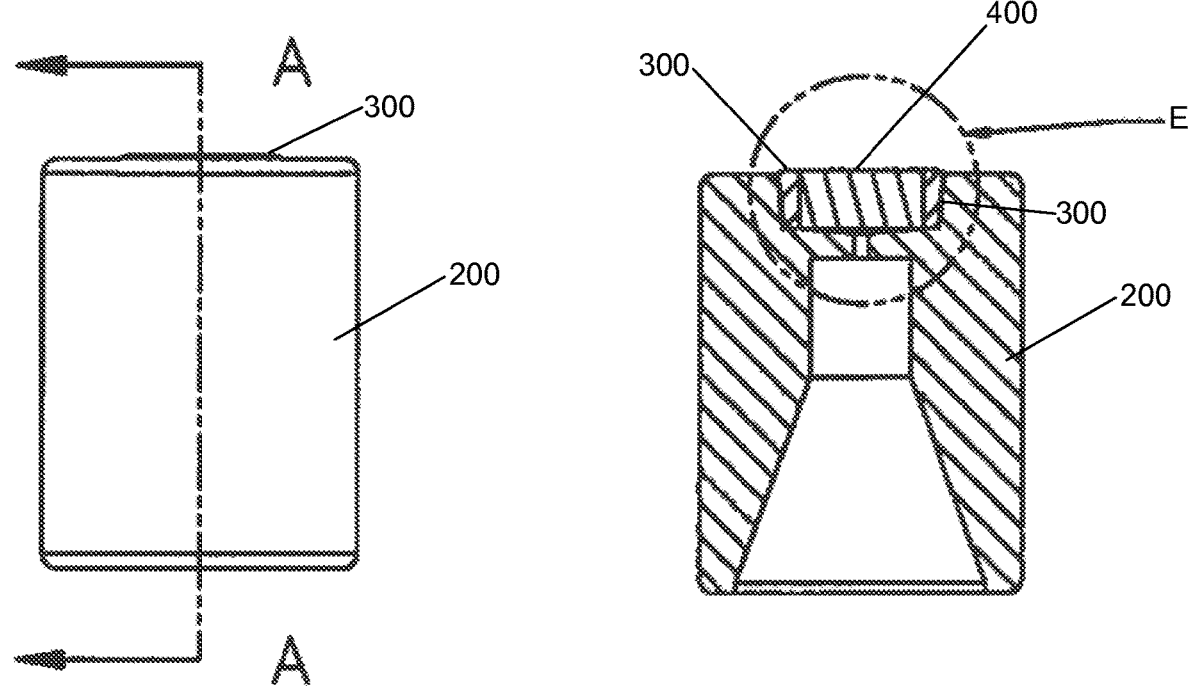
FIG. 6B
FIG. 6C
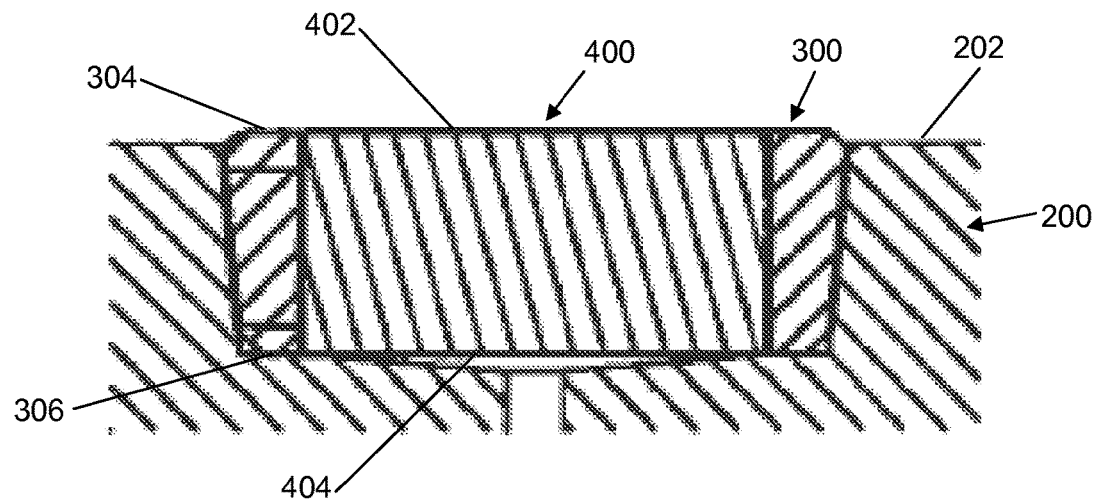
FIG. 6D

CHROMATOGRAPHIC FILTER

RELATED APPLICATIONS

This application is the National Stage of International Application No. PCT/US2014/041274, filed on Jun. 6, 2014, which claims priority to and benefit of U.S. Provisional Patent Application Ser. No. 61/832,177 entitled "Chromatographic Filter," filed Jun. 7, 2013. The contents and teachings of this application are hereby expressly incorporated herein by reference in their entirety.

FIELD OF THE INVENTION

The present invention generally relates to chromatographic columns, and in particular, to filter assemblies for use with chromatographic columns.

BACKGROUND

Liquid chromatography systems are used to carry out chemical separations. A typical liquid chromatography system consists of the following major components: a pump, an injector, a column, and a detector. The pump compels a mobile phase, for example, a solution, through a fluid path comprising an injector, column and a detector. The injector permits the introduction of samples into the fluid stream above the column. The column contains a packed bed of media. The media is normally porous and relatively inert. Compounds in the sample will exhibit a characteristic affinity to the media. That is, some compounds exhibit high affinity and some compounds exhibit low affinity. As a result, as the compounds are carried through the media, the compounds separate into bands which elute or come off the column at different times. These bands are detected by the detector.

Sintered porous filters are widely used at the inlet and outlet of chromatographic columns for the retention of the media in the columns. Sintered filters are typically made by compacting particles having a controlled particle size distribution into a desired shape, and then sintering to form an interconnected network of pores within the filter. Filters commonly used for chromatographic purposes can be made from a variety of materials, such as stainless steel, titanium, polyetheretherketone (PEEK), or polyethylene. The majority of columns in use today are manufactured using 316 stainless steel filters, since this material provides a good balance of high strength, low cost, and corrosion resistance.

Sintered porous metal filters capable of retaining small particulates are typically made by pressing or molding metal or metal alloy powders into a desired shape. The formed shape is then sintered at high temperatures to provide a consolidated porous object. These porous materials are manufactured for specific applications and have characteristics that are dependent on the size, shape, and type of powder, in addition to the compression and temperature used in the process.

Conventional sintered filters are sealed within the column, or within a housing coupled to the column, using an interference fit between the filter and a receiving bore in the mating portion of the column or housing. As the filter is pressed into the receiving bore, the interference can cause damage along the circumference and/or the face of the filter. The damage can result in regions of the filter having undesirable flow characteristics. For example, damage to the filter can cause faster flow in the middle of the column than at the outer wall. These undesirable flow characteristics can cause excessive peak tailing, as well as other problems.

Other techniques for sealing a filter into a column include welding, brazing, or the use of adhesives to seal the filter into a mating part. These techniques can also result in undesirable flow characteristics resulting from changes to the filter in the areas affected by the joining method. Other disadvantages of these techniques include material limitations and the need for specialized equipment and manufacturing methods.

Accordingly, there is a need for an improved method for sealing a filter within a column, and for an apparatus that will facilitate such a goal.

SUMMARY

The present invention generally provides filters and methods of assembling filters. In one aspect of the invention, the filter includes a porous element, a compression element, and a housing. The compression element can be configured to receive the porous element, thereby forming an assembly. For example, the compression element can receive the porous element in a slip-fit relationship.

The porous element can include an upper surface, a lower surface, and a circumferential sidewall intersecting the upper surface and the lower surface. For example, the porous element can be a frit configured for use in a chromatography system, e.g., a high pressure liquid chromatography (HPLC) system. As used herein, the term "frit" refers to any porous structure having a plurality of void spaces capable of retaining chromatographic particles. Encompassed in this definition is any number of known structures that are typically referred to as frits, filters, or screens.

The housing can have an opening formed therein that is configured to receive the assembly. In some embodiments, the assembly can be retained within the opening when the assembly is received therein. For example, the opening can receive the assembly in a press-fit relationship. In exemplary embodiments, the porous element can have a uniform radial porosity when the assembly is retained within the housing. In some embodiments, the porosity of the upper surface of the porous element can be substantially the same as the porosity of the lower surface of the porous element when the assembly is retained within the housing.

The compression element can include a cylindrical body having an upper surface, a lower surface, an inner circumferential surface and an outer circumferential surface. The outer circumferential surface of the cylindrical body has a first diameter at an intersection between the outer circumferential surface and the upper surface and a second diameter at an intersection between the outer circumferential surface and the lower surface. In exemplary embodiments, the first diameter can be greater than the second diameter. For example, the outer circumferential surface of the cylindrical body can be tapered such that a first diameter of the compression element at an intersection between the outer circumferential surface and the upper surface is greater than a second diameter of the compression element at an intersection between the outer circumferential surface and the lower surface. In some embodiments, the compression element can include a polymeric ring, e.g., a polyetheretherketone (PEEK) ring.

The opening in the housing can include an inner circumferential sidewall that includes an upper edge and a lower edge. The inner circumferential sidewall of the opening has a first diameter at an intersection between the inner circumferential sidewall and the upper edge and a second diameter at an intersection between the inner circumferential sidewall and the lower edge. In exemplary embodiments, the first diameter is greater than the second diameter. In some embodiments, an upper surface of the compression element can extend beyond an upper edge of the opening in the housing when the assembly is retained within the housing. For example, the upper surface of the compression element can provide a sealing surface when the assembly is retained within the housing. In some embodiments, an upper surface of the compression element can be flush with an upper edge of the opening in the housing when the assembly is retained within the housing. In further embodiments, an upper surface of the compression element can be recessed with respect to an upper edge of the opening in the housing when the assembly is retained within the housing.

Another aspect of the invention provides methods of assembling a filter. In one exemplary embodiment, the method can include providing a porous element, providing a compression element configured to receive the porous element, inserting the porous element into the compression element to form an assembly, providing a housing having an opening formed therein, the opening configured to receive the assembly, and inserting the assembly into the opening such that the assembly is retained therein.

The compression element can include a cylindrical body having an upper surface, a lower surface, an inner circumferential surface and an outer circumferential surface. The outer circumferential surface of the cylindrical body has a first diameter at an intersection between the outer circumferential surface and the upper surface and a second diameter at an intersection between the outer circumferential surface and the lower surface. In exemplary embodiments, the first diameter can be greater than the second diameter. For example, the outer circumferential surface of the cylindrical body can be tapered such that a first diameter of the compression element at an intersection between the outer circumferential surface and the upper surface is greater than a second diameter of the compression element at an intersection between the outer circumferential surface and the lower surface. In some embodiments, the compression element can include a polymeric ring, e.g., a polyetheretherketone (PEEK) ring.

The porous element can include an upper surface, a lower surface, and a circumferential sidewall intersecting the upper surface and the lower surface. The porous element can include, for example, a frit. The compression element can receive the porous element in a slip-fit relationship and the step of inserting the porous element into the compression element can include slipping the porous element into the compression element.

The opening in the housing can include an inner circumferential sidewall, the inner circumferential sidewall including an upper edge and a lower edge. The inner circumferential sidewall of the opening can have a first diameter at an intersection between the inner circumferential sidewall and the upper edge and a second diameter at an intersection between the inner circumferential sidewall and the lower edge. In exemplary embodiments, the first diameter is greater than the second diameter. For example, the inner circumferential sidewall of the opening formed in the housing can be tapered such that a diameter of the upper edge of the inner circumferential sidewall is greater than a diameter of the lower edge of the inner circumferential sidewall The opening in the housing can receive the assembly in a press-fit relationship and the step of inserting the assembly into the housing comprises pressing the assembly into the housing. In some embodiments, the step of inserting the assembly into the opening can include applying a force to the assembly. For example, the force can be sufficient to advance the assembly into the opening in the housing. As the assembly is advanced into the opening in the housing, the porous element and the compression element can remain stationary relative to one another. An interaction between the inner circumferential wall of the opening and the outer circumferential surface of the compression element can convert the force applied to the assembly, e.g., the force applied to an upper surface of the assembly, into a radial force between the inner circumferential surface of the compression element and the outer surface of the porous element.

In another aspect of the invention, a chromatographic column is provided that includes a filter according to the embodiments discussed herein. The filter can be coupled to the column, e.g., the housing of the filter can be coupled to an end of the column. In other embodiments, filter can be formed as part of an end of the column. For example, the end of the column can form the housing. In these exemplary embodiments, the opening configured to receive the assembly can be formed in an end of the column.

BRIEF DESCRIPTION OF THE DRAWINGS

The invention will be more fully understood from the following detailed description taken in conjunction with the accompanying drawings, in which:

FIG. 6B is a side view of the housing of FIG. 6A;

FIG. 6C is a cross-sectional view of the housing of FIG. 6B taken along the line A-A in FIG. 6B;

FIG. 6D is an enlarged cross-sectional view of a portion of the housing, compression element, and porous element of FIG. 6C in region B;

DETAILED DESCRIPTION

Certain exemplary embodiments will now be described to provide an overall understanding of the principles of the structure, function, manufacture, and use of the devices and methods disclosed herein. One or more examples of these embodiments are illustrated in the accompanying drawings. Those skilled in the art will understand that the devices and methods specifically described herein and illustrated in the accompanying drawings are non-limiting exemplary embodiments and that the scope of the present invention is defined solely by the claims. The features illustrated or described in connection with one exemplary embodiment may be combined with the features of other embodiments. Such modifications and variations are intended to be included within the scope of the present invention.

Figure 1:
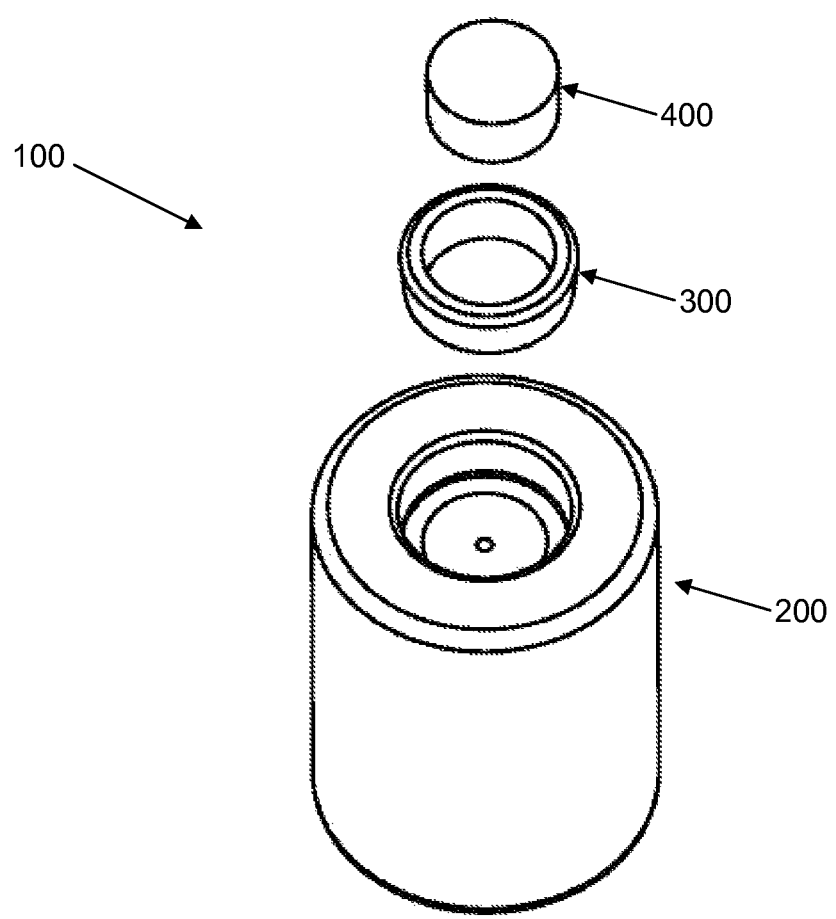
FIG. 1 is an isometric view of a porous element, compression element and housing according to one embodiment of the invention.

The present invention generally provides filter devices for use with chromatography columns and methods for assembling those filter devices. FIG. 1 illustrates one exemplary embodiment of a filter device 100. As shown, the filter device 100 includes a housing 200, a compression element 300, and a porous element 400. As discussed in more detail below, the housing 200, compression element 300, and porous element 400 are adapted or configured to be assembled to form the filter device 100. The filter device 100 can, in some embodiments, be coupled to or disposed in a chromatographic column.

Housing

FIGS. 2A-2D illustrate an exemplary embodiment of the housing 200. As shown, the housing 200 has a cylindrical shape including a first end surface 202, a second end surface 204, and a cylindrical outer surface 206. The housing 200 can be made of any substantially rigid material, such as plastic or metal. For example, the housing 200 can be made from a material such as metals, metal alloys, or polymers. More specifically, the housing 200 can be made from a material such as stainless steel, brass, titanium, polyetheretherketone (PEEK), polyethylene, Hastaloy™, or polypropylene. In a preferred embodiment, the housing 200 can be made from stainless steel.

In some embodiments, the intersection between the end surfaces 202, 204 with the outer surface 206 can be rounded or chamfered. The housing also includes an opening 208 formed in the first end surface 202 of the housing. The opening 208 is defined by a sidewall 210 and a bottom surface 212. The intersection between the surface of the sidewall 210 and a plane defined by the first end surface 202 can be a circle. Likewise, the intersection between the surface of the sidewall 210 and the bottom surface 212 can be a circle. In some embodiments, the intersection between the surface of the sidewall 210 and a plane defined by the first end surface 202 can be rounded or chamfered.

Figure 2A:
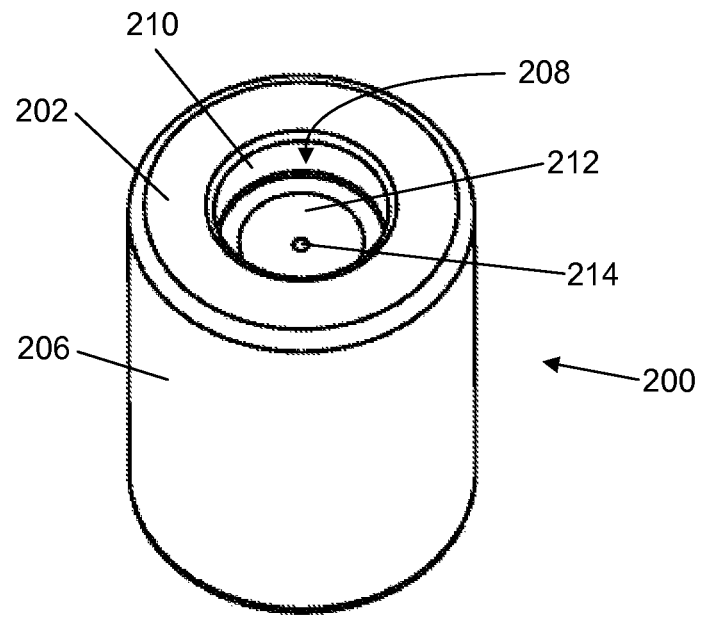
FIG. 2A is an isometric view of a housing according to one embodiment of the invention.
Figure 2B:
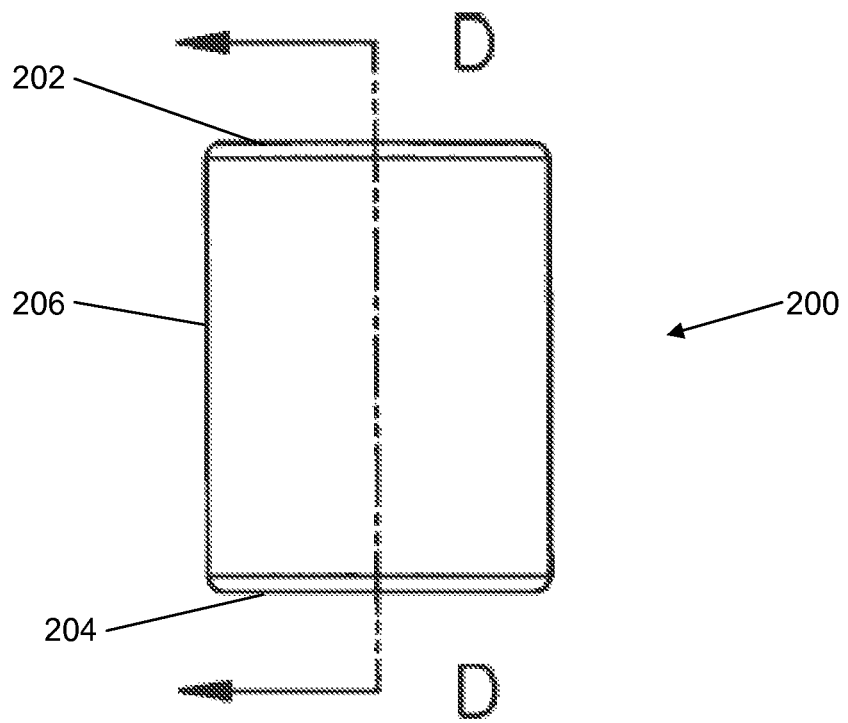
FIG. 2B is a side view of the housing of FIG. 2A.

Referring to FIG. 2B, the first end surface 202 and the second end surface 204 are substantially perpendicular to the longitudinal axis of the housing 200 along line D-D. As shown, the first end surface 202 and second end surface 204 are substantially parallel to each other. In some embodiments, the intersection between the end surfaces 202, 204 with the outer surface 206 can be rounded or chamfered.

Figure 2C:
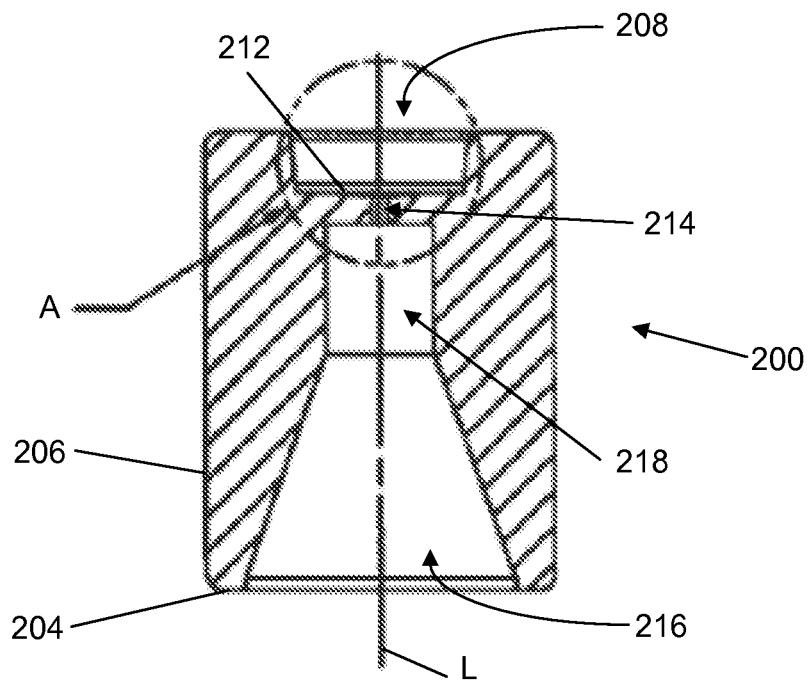
FIG. 2C is a cross-sectional view of the housing of FIG. 2B taken along line D-D in FIG. 2B.

FIG. 2C illustrates various internal features of the housing 200 in a cross-sectional view taken along line D-D in FIG. 2B. As shown, a through-hole 214 is formed within the opening 208 through the bottom surface 212. In some embodiments, the through-hole 214 can be formed in the center of the bottom surface of the opening 208.

As shown in FIG. 2C, the through-hole 214 communicates with a sealing cone 216. The sealing cone 216 can be configured to engage a sealing element, e.g., a ferrule (not shown). In the illustrated embodiment, a cylindrical portion 218 is disposed between the sealing cone 216 and the through-hole 214. The cylindrical portion 218 can, for example, receive a projecting portion of a fluid conduit disposed within the housing.

Figure 2D:
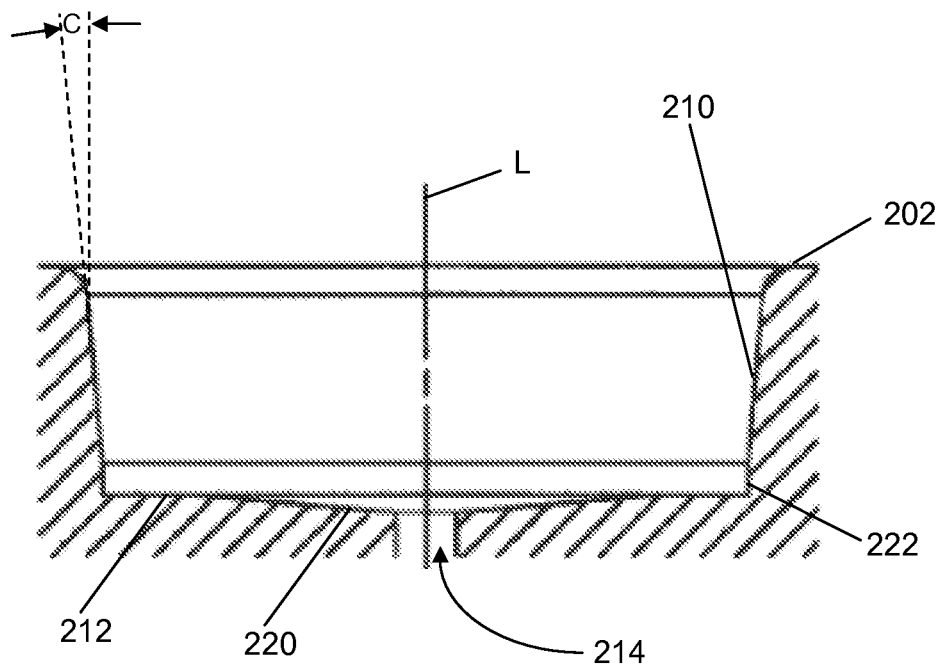
FIG. 2D is an enlarged cross-sectional view of a portion of the housing of FIG. 2C in region A.

As shown in FIG. 2D, which shows an enlarged view of region A in FIG. 2C, the sidewall 210 can be tapered. For example, the diameter of the circle formed by the intersection of the bottom surface 212 and the sidewall 210 can be smaller than the diameter of the circle formed by the intersection of the plane defined by the first end surface 202 and the sidewall 210. The taper angle C can be measured relative to the longitudinal axis of the housing taken along line D-D, designated L in FIGS. 2C and 2D. The taper angle C can be selected to substantially match the taper angle of the compression element 300, as discussed in more detail below.

In some embodiments, the tapered surface of the sidewall 210 can be a truncated conical surface, i.e., the diameter of the sidewall 210 can increase at a substantially constant rate from the diameter at or near the bottom surface to the diameter at or near the top surface. In such instances, the surface of the sidewall 210 can be described as being frustoconical. In an exemplary embodiment, the taper angle can be about 5 degrees. In other embodiments the taper angle can be in the range of about 15 degrees to about 1 degree, or any angle in that range, e.g., any of about 15 degrees, about 10 degrees, about 8 degrees, about 3 degrees, about 2 degrees, and about 1 degree.

As illustrated in FIG. 2D, the intersection between the first end surface 202 and the sidewall 210 can, in some embodiments, be rounded or chamfered, e.g., for easier insertion of the assembly formed by the compression element 300 and the porous element 400 into the opening 208. In other embodiments, the intersection can be a sharp edge between the two surfaces, 202, 210.

In some embodiments, the tapered surface of the sidewall 210 can extend from the first end surface 202 (or from a rounded or chamfered intersection between those surfaces) to the bottom surface 212. In other embodiments, the opening 208 can include a substantially cylindrical region 222 of the sidewall 210 near the bottom surface 212. The wall of the substantially cylindrical region 222 of the sidewall 210 can be parallel to the longitudinal axis of the housing taken along line D-D, designated L in FIGS. 2C and 2D. In these embodiments, the tapered surface of the sidewall 210 can extend from the first end surface 202 (or from a rounded or chamfered intersection between those surfaces) to the substantially cylindrical region 222 of the sidewall 210. The substantially cylindrical region 222 of the sidewall 210 can ease the interaction between the sidewall 210 and the assembly formed by the compression element 300 and the porous element 400 so as to allow the assembly to make contact with the bottom surface 212 when the assembly is inserted into the opening 208, as discussed in more detail below.

The bottom surface 212 of the opening 208 can include a conical surface 220 surrounding the through-hole 214. The conical surface 220 forms a distribution cone that can distribute fluid to and from the porous element 400 over substantially the entire area of the porous element 400 as homogeneously as possible. In some embodiments, the conical surface 220 can extend from the through-hole 214 to the intersection between the bottom surface 212 and the sidewall 210. In other embodiments, the conical surface 220 can have a diameter substantially the same as the diameter of the porous element. In another embodiment, the conical surface can have a diameter of about 80% of the diameter of the porous element. For example, the conical surface can have a diameter in the range of about 50% to about 80% of the diameter of the porous element. In other embodiments, the conical surface 220 can have a diameter of about 80% of the diameter of the diameter of the bottom surface 212 of the opening 208. In some embodiments, the conical surface 220 can have a diameter in the range of about 80% to about 60% of the diameter of the diameter of the bottom surface 212 of the opening 208.

The depth of the opening 208, i.e., the distance between the plane defined by the end surface 202 and the plane defined by the bottom surface 212 of the opening 208, can be selected to be substantially the same as the thickness of the compression element 300, as discussed in more detail below. In some embodiments, the depth of the opening 208 can be selected to be less than the thickness of the compression element 300. In such embodiments, the upper surface 304 of the compression element 300 can extend out of the opening 208, e.g., remain proud of the end surface 202 of the housing 200. In these embodiments, the compression element 300 can provide a secondary seal with other components that can engage the first end surface 202 of the housing 200.

Compression Element

Figure 3A:
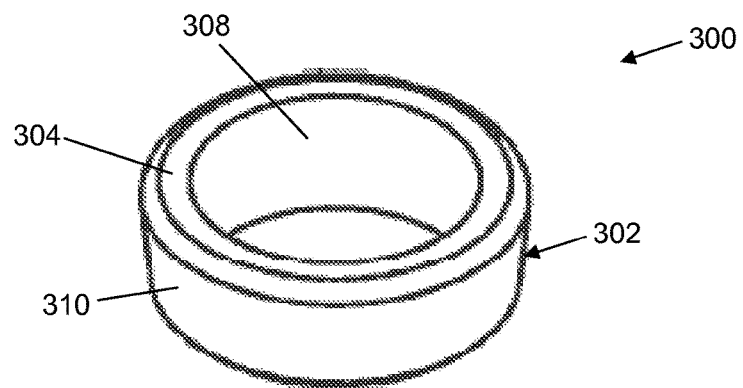
FIG. 3A is an isometric view of a compression element according to one embodiment of the invention.
Figure 3B:
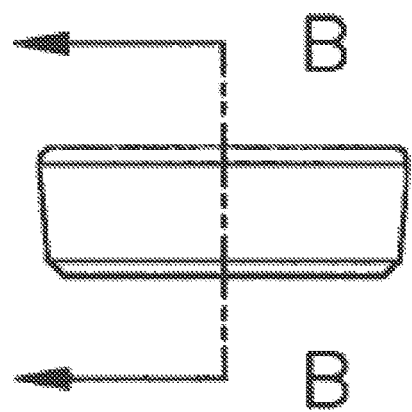
FIG. 3B is a side view of the compression element of FIG. 3A.
Figure 3C:
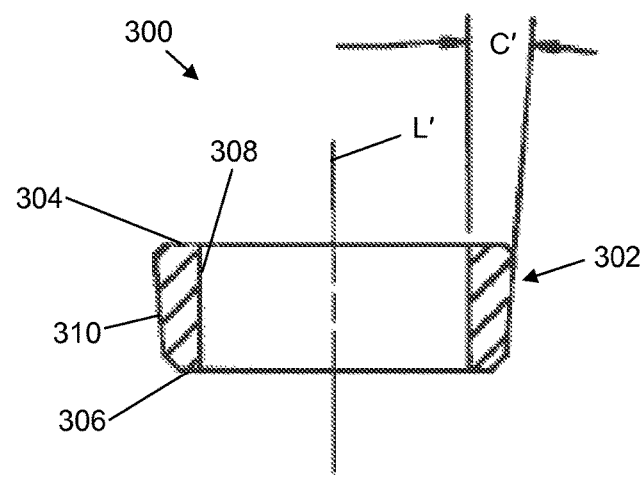
FIG. 3C is a cross-sectional view of the compression element of FIG. 3B taken along the ling B-B in FIG. 3B.

FIGS. 3A-3C illustrate an exemplary embodiment of the compression element 300. As shown, the compression element 300 has a generally cylindrical body 302. The cylindrical body 302 has an upper surface 304, a lower surface 306, an inner circumferential surface 308, and an outer circumferential surface 310. The inner circumferential surface 308 defines an opening in the ring-shaped cylindrical body 302. The intersections between the upper surface 304 and the lower surface 306 with the outer surface 310 can, in some embodiments, be chamfered or rounded. The wall defining the inner circumferential surface 308 of the compression element 300 can be parallel to the longitudinal axis of the compression element 300 taken along line B-B, designated L' in FIG. 3C.

The compression element 300 can have a thickness, i.e., the distance between the upper surface 304 and the lower surface 306, selected to be substantially the same as the depth of the opening 208 in the housing 200. In some embodiments, the thickness of the compression element 300 can be selected to be greater that the depth of the opening 208. In such embodiments, the upper surface 304 of the compression element 300 can extend out of the opening 208, e.g., remain proud of the end surface 202 of the housing 200. In these embodiments, the compression element 300 can provide a secondary seal with other components that can engage the first end surface 202 of the housing 200.

As shown in FIG. 3C, the outer circumferential surface 310 can be tapered. For example, the diameter of the circle formed by the intersection of the plane defined by the lower surface 306 and the outer circumferential surface 310 can be smaller than the diameter of the circle formed by the intersection of the plane defined by the upper surface 304 and the outer circumferential surface 310. The taper angle C' can be measured relative to the longitudinal axis of the compression element 300 taken along line B-B, designated L' in FIG. 3C. The taper angle C' can be selected to substantially match the taper angle of the housing 200.

In some embodiments, the tapered outer circumferential surface 310 can be a truncated conical surface, i.e., the diameter of outer circumferential surface 310 can increase at a substantially constant rate from the diameter at or near the bottom surface to the diameter at or near the top surface. In an exemplary embodiment, the taper angle can be about 5 degrees. In other embodiments the taper angle C' can be in the range of about 15 degrees to about 1 degree, or any angle in that range, e.g., any of about 15 degrees, about 10 degrees, about 8 degrees, about 3 degrees, about 2 degrees, and about 1 degree.

The diameter of the tapered outer circumferential surface 310 of the compression element 300 can be larger than the tapered inner diameter of the opening 208 formed in the first end surface 202 of the housing 200. However, as noted above, the taper angles of the components are, in exemplary embodiments, the same. For example, the diameters of the tapered outer circumferential surface 310 of the compression element 300 and the tapered inner diameter of the opening 208 formed in the first end surface 202 of the housing 200 can be selected to provide a press-fit relationship between the compression element 300 and the opening 208 in the housing 200. For example, the diameter of the outer circumferential surface 310 of the compression element 300 can be about 2% greater than the inner diameter of the opening 208. In an exemplary embodiment, the inner diameter of the opening 208 can be about 0.110 inches and the diameter of the outer circumferential surface 310 of the compression element 300 can be about 0.112.

The compression element 300 can be made of any material softer than the material of the housing 200. For example, the compression element 300 can be made from a material selected from metals, metal alloys, or polymers. More specifically, the compression element 300 can be made from a material such as titanium, stainless steel, polyetheretherketone (PEEK), polyethylene, or polypropylene. In a preferred embodiment, the compression element 300 can be made from polyetheretherketone (PEEK). When the compression element 300 and the housing 200 are made from the same type of material, e.g., a housing 200 and compression element 300 both made from titanium or stainless steel, the hardness of the material used for the compression element 200 is selected to be less than the hardness of the material used for the housing 200. For example, the housing 200 and compression element 300 can be made from different grades of the same material.

Porous Element

Figure 4:
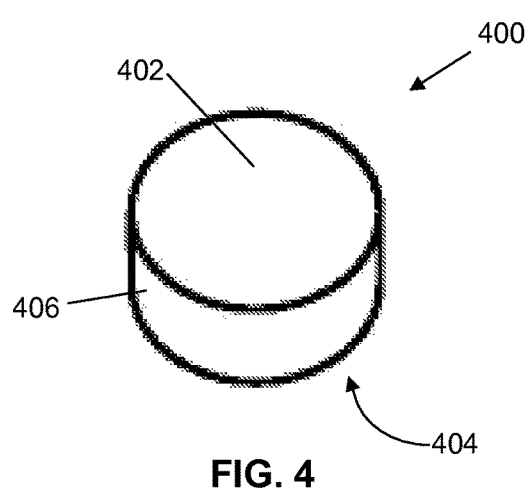
FIG. 4 is an isometric view of a porous element according to an embodiment of the invention.

FIG. 4 illustrates an exemplary embodiment of the porous element 400. As shown, the porous element 400 has a generally cylindrical body including an upper surface 402, a lower surface 404, and a circumferential sidewall 406 intersecting the upper surface 402 and the lower surface 404. The porous element 400 can have a porous structure including a plurality of void spaces.

Porous elements of different grades, or nominal particle retention ratings, are commercially available. Such porous elements can be designed for use in an HPLC column or other liquid or gas chromatography applications. Those skilled in the art will recognize that porous support structures are also known as chromatographic frits or filters. As used herein, the term "porous element" refers to any of a number of porous elements, e.g., chromatographic frits or filters, which preferably have grades or particle retention ratings suitable for use in HPLC, either in chromatographic columns or as in-line filters. These porous support structures typically have nominal porosity and pore size grades, and are capable of retaining particles smaller than about 2.5 microns in diameter. Porous elements that are suitable for making frits according to the subject invention include porous sintered stainless steel porous elements with grades ranging from about 0.1 micron to about 10 micron, for example, 0.5 micron grade and 2.0 micron grade stainless steel porous support structures. The porous elements can be made from particles that are compacted and sintered according to techniques known in the art, thereby producing structures with the specified grades. The porous element can be made of any material suitable for producing a sintered porous element, such as titanium, stainless steel, PEEK, polyamide, polyolefin, or PTFE.

The diameter of the circumferential sidewall 406 of the porous element 400 and the diameter of the inner circumferential surface 308 of the compression element 300 can be selected to provide a slip-fit relationship between the porous element 400 and the compression element 300 when the porous element is received in the compression element. For example, the diameter of the circumferential sidewall 406 of the porous element 400 can be substantially the same, or slightly smaller than, the diameter of the inner circumferential surface 308 of the compression element 300. In an exemplary embodiment, the diameter of the circumferential sidewall 406 of the porous element 400 can be about 0.082 inches and the diameter of the inner circumferential surface 308 of the compression element can be about 0.0833. For example, the difference between the inner diameter of the opening 208 and the diameter of the circumferential sidewall 406 of the porous element 400 can be in the range of about 0.001 inches to about 0.003 inches, e.g., about 0.0015 inches.

The thickness of the porous element, i.e., the distance between the upper surface 402 and the lower surface 404, can be substantially the same as the thickness of the compression element 300. In some embodiments, the thickness of the porous element 400 can be slightly less than the thickness of the compression element 300. For example, in embodiments in which the thickness of the compression element 300 is greater that the depth of the opening 208 in the housing 200, the porous element 400 can have a thickness less than the thickness of the compression element so as to avoid damage to the porous element 400 when the upper surface 304 of the compression element 300 engages other components.

Assembly

Figure 5:
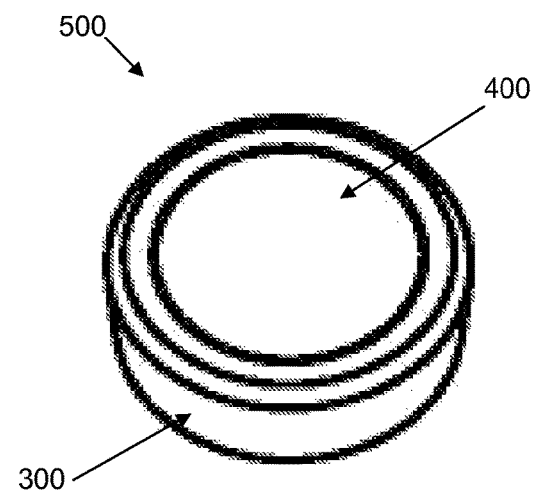
FIG. 5 is an isometric view of an assembly formed by a porous element received within a compression element according to an embodiment of the invention.

FIG. 5 illustrates an exemplary embodiment of an assembly 500 formed when the porous element 400 is received within the compression element 300. As discussed above, the compression element 300 can receive the porous element 400 in a slip-fit relationship. For example, the sidewall 406 of the porous element 400 can engage the inner circumferential surface 308 of the compression element 300 in a slip-fit relationship. In some embodiments, the slip-fit relationship between the porous element and the compression element can be sufficient to temporarily hold the porous element within the compression element prior to further assembly of those components into the housing 200.

Figure 6A:
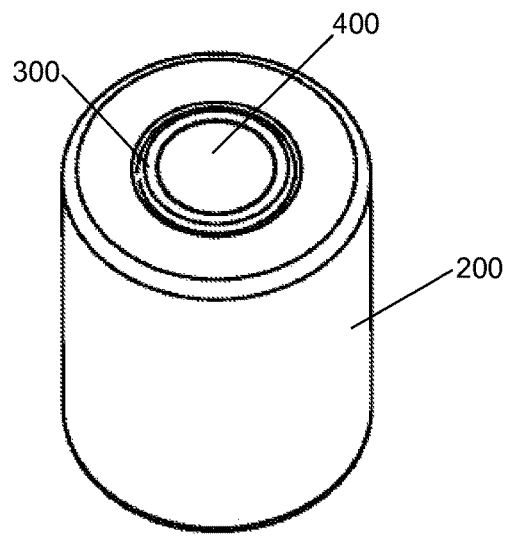
FIG. 6A is an isometric view of the assembly of FIG. 5 received within the a housing according to an embodiment of the invention.

FIG. 6A illustrates an exemplary embodiment of the assembly 500 (i.e. the porous element 400 received within the compression element 300) received within the opening 208 in the housing 200. FIG. 6C illustrates various internal features of the housing 200 in a cross-sectional view taken along line A-A in FIG. 6B. As shown, the porous element 400 is surrounded by the compression element 300 within the opening 208 of the housing 200.

Figure 6E:
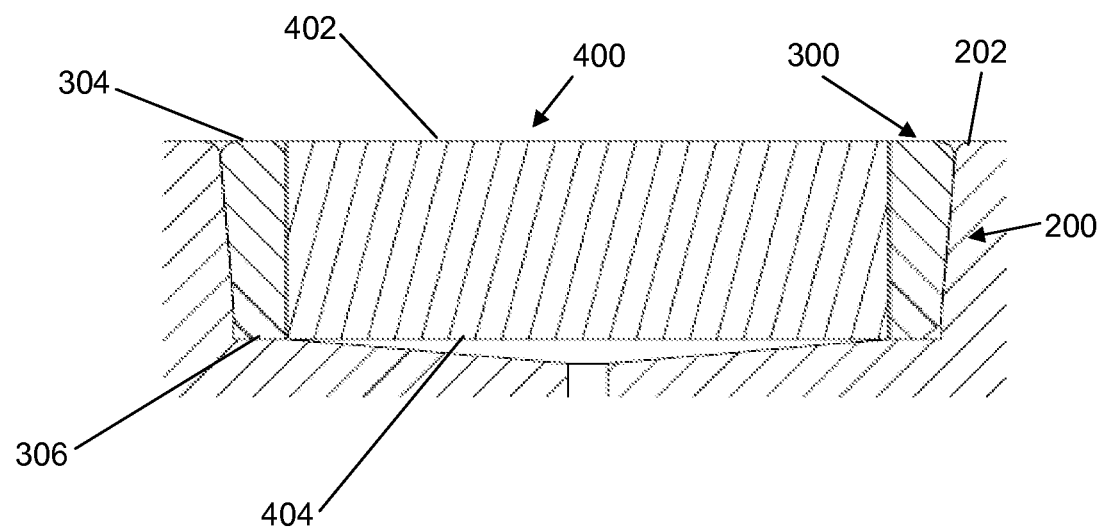
FIG. 6E is an enlarged cross-sectional view of a portion of the housing, compression element, and porous element according to another embodiment of the invention.
Figure 6F:
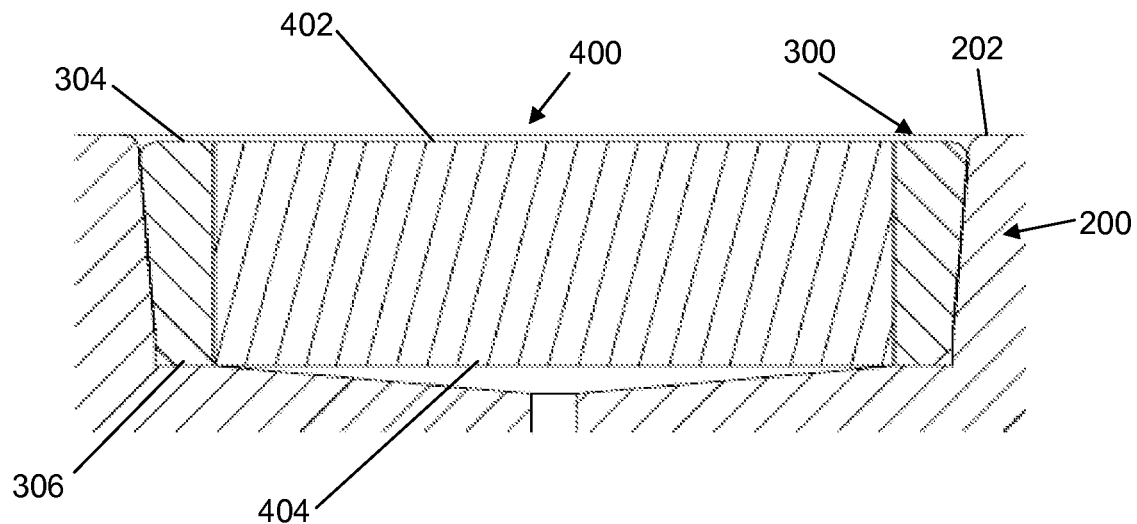
FIG. 6F is an enlarged cross-sectional view of a portion of the housing, compression element, and porous element according to another embodiment of the invention.

FIGS. 6D, 6E, and 6F show enlarged views of region E in FIG. 6C in different embodiments. As shown in FIG. 6D, the upper surface 304 of the compression element 300 can extend beyond the end surface 202 of the housing 200, e.g., remain proud of the end surface 202 of the housing 200. In such an embodiment, the compression element 300 can provide a secondary seal with other components that may couple or be coupled to the first end surface 202 of the housing 200. For example, the compression element 300 can extend about 0.005 inches beyond the end surface 202 of the housing 200. In other embodiments, the upper surface 304 of the compression element 300 can be flush with the end surface 202 of the housing 200, e.g., as shown in FIG. 6E. In some embodiments, the upper surface 304 of the compression element 300 can be recessed with respect to the end surface 202 of the housing 200, e.g., as shown in FIG. 6F. The relationship between the upper surface 304 of the compression element 300 and the end surface 202 of the housing 200, i.e., proud, flush, or recessed, can be selected by adjusting the depth of the opening 208 relative to the thickness of the compression element 300, or vice versa. For example, the upper surface of the compression element can provide a sealing surface when the assembly is retained within the housing.

Similarly, the upper surface 402 of the porous element 400 can, in some embodiments, be flush with the upper surface 304 of the compression element 300, e.g., as shown in FIG. 6D. In other embodiments, the upper surface 402 of the porous element 400 can be recessed with respect to the upper surface 304 of the compression element 300 or can extend beyond the upper surface 304 of the compression element 300, e.g., remain proud of the end the upper surface 304 of the compression element 300. In any of these exemplary embodiments, the upper surface 402 of the porous element 400 can also extend beyond the end surface 202 of the housing 200, be flush with the end surface 202 of the housing 200, or be recessed with respect to the end surface 202 of the housing 200. The relationship between the upper surface 402 of the porous element 400 and the end surface 202 of the housing 200 can be independent of the relationship between the upper surface 402 of the porous element 400 and the upper surface 304 of the compression element 300. The relationship between the upper surface 402 of the porous element 400, the upper surface 304 of the compression element 300, and the end surface 202 of the housing 200, i.e., proud, flush, or recessed, can be selected by adjusting any of the depth of the opening 208, the thickness of the compression element 300, and the thickness of the porous element 400.

As discussed above, the compression element 300 can be received within the opening 208 in a press-fit relationship. When the assembly 500 is disposed within the opening 208, the compression element 300 can be deformed slightly. The deformation of the compression element 300 can cause a corresponding reduction in diameter of the inner circumferential surface 308. The reduction in diameter of the inner circumferential surface 308 can cause a radial compressive force to be applied to the circumferential sidewall 406 of the porous element 400. The compressive force between the inner circumferential surface 308 of the compression element and the circumferential sidewall 406 of the porous element 400 can retain the porous element within the compression element 300. In exemplary embodiments, the force applied by the compression element 300 to the porous element 400 can be sufficient to retain the porous element therein without damage to the porous element. In other exemplary embodiments, the force applied by the compression element 300 to the porous element 400 can be sufficient to retain the porous element therein with minimal damage in the region of the circumferential sidewall 406 of the porous element.

In some embodiments, the porous element 400 can be retained within the compression element 300 by frictional engagement between the inner circumferential sidewall 308 of the compression element 300 and the circumferential sidewall 406 of the porous element 400. In other embodiments, the porous element 400 can be retained within the compression element 300 by deformation of the inner circumferential sidewall 308 of the compression element 300 around the circumferential sidewall 406 of the porous element 400. In such embodiments, the deformation of the inner circumferential sidewall 308 around the porous element 400 can form an extension, e.g., a lip, in a region around the circumference of the sidewall 308 proximate to the upper surface 402 of the porous element.

FIGS. 7A-7E illustrate an exemplary chromatographic column 700 according to another embodiment of the invention. As shown, the column 700 includes a column body 702, a first end fitting 704 and a second end fitting 706. The column body 702 also includes an inner bore 703. For example, the inner bore 703 can contain a packed bed of media. The column 700 can also include a filter, e.g., a filter according to the various embodiments disclosed herein. The filter can be coupled to the column, e.g., to an end thereof. The column body 702 and end fittings 704, 706 can be made of any substantially rigid material, such as plastic or metal. For example, the column body 702 and end fittings 704, 706 can be made from materials such as metals, metal alloys, or polymers. More specifically, the column body 702 and end fittings 704, 706 can be made from a material such as stainless steel, brass, titanium, polyetheretherketone (PEEK), polyethylene, Hastaloy™, or polypropylene. In some embodiments, the column body 702 and end fittings 704, 706 can each be made from the same material. In other embodiments, the column body 702 and end fittings 704, 706 can be made from different materials.

In the illustrated embodiment of FIGS. 7A-7E, the column 700 includes a first filter device 708 and a second filter device 710. The filter devices 708, 710 can be coupled to the column by the end fittings 704, 706. For example, the end fittings can include threads that cooperate with threads on the column to couple to the end fittings to the column. The end fittings, filters devices, and column each include a fluid pathway therethrough. As shown in the sectional view of FIG. 7D, the filter devices 708, 710 can be received within respective openings 712, 714 in the end fittings 704, 706.

Figure 7A:
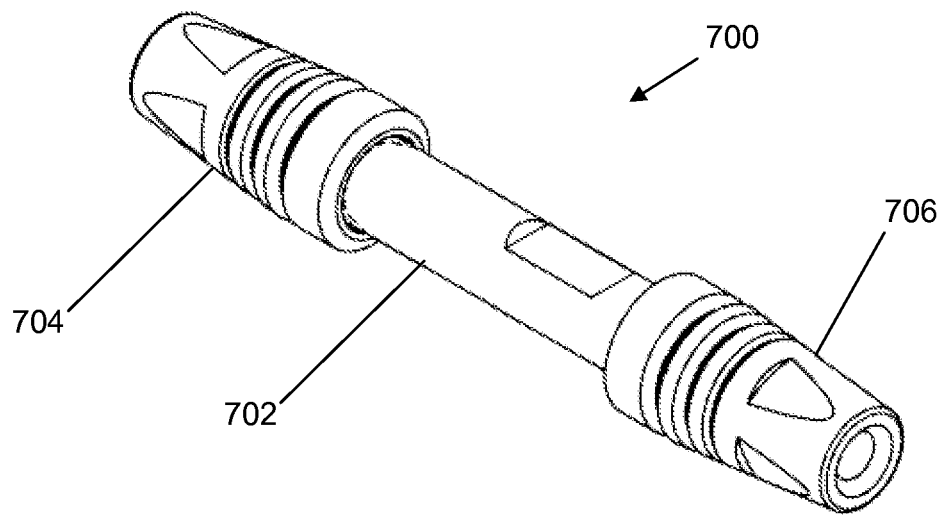
FIG. 7A is an isometric view of a chromatographic column according to an embodiment of the invention.
Figure 7B:
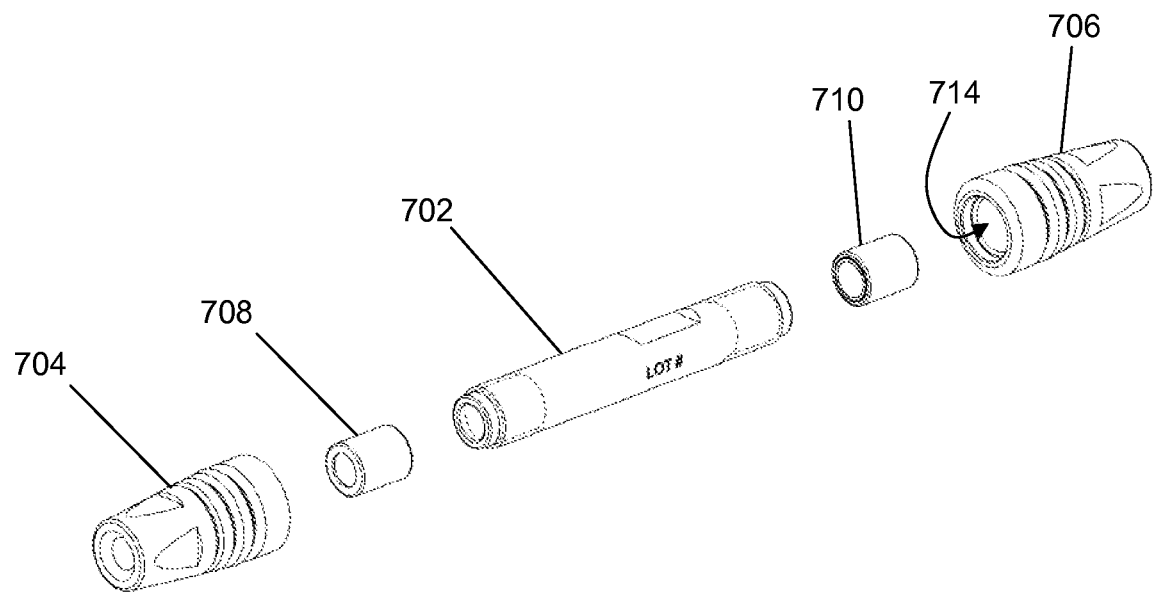
FIG. 7B is an exploded view of the chromatographic column of FIG. 7A.
Figure 7C:
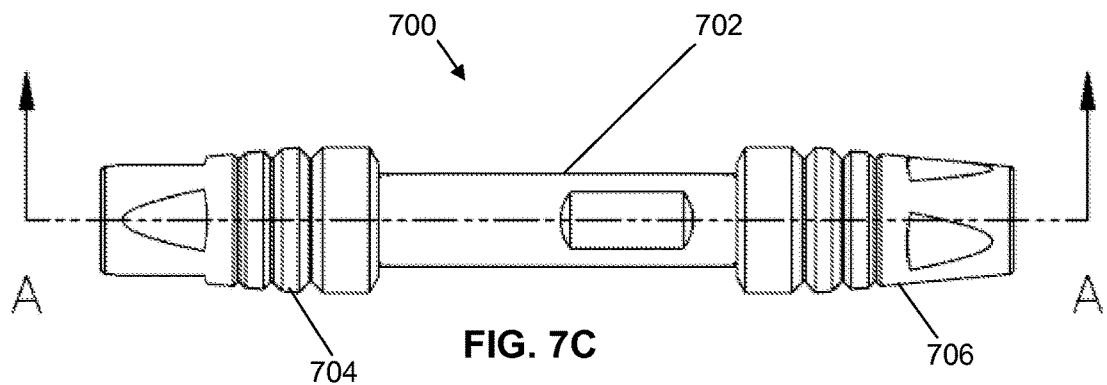
FIG. 7C is a side view of the chromatographic column of FIG. 7A.
Figure 7D:
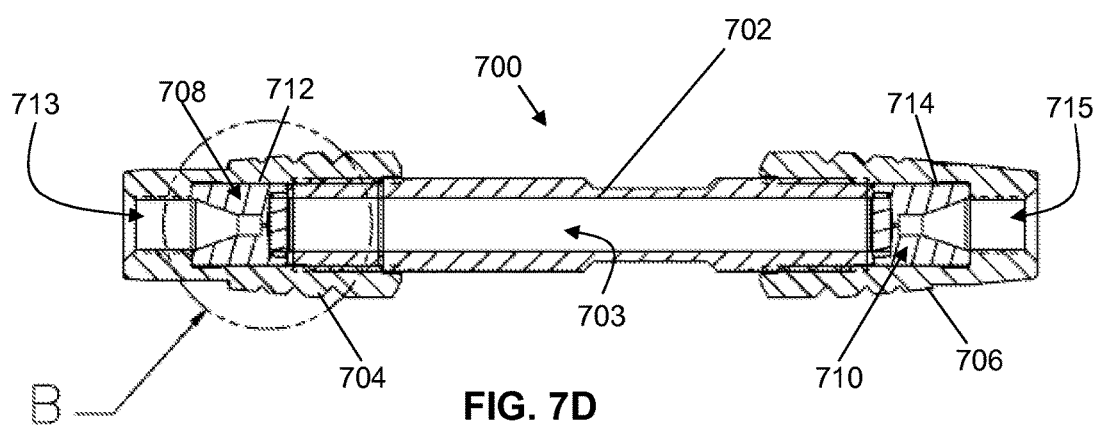
FIG. 7D is a cross-sectional view of the chromatographic column of FIG. 7C taken along line A-A in FIG. 7C.
Figure 7E:
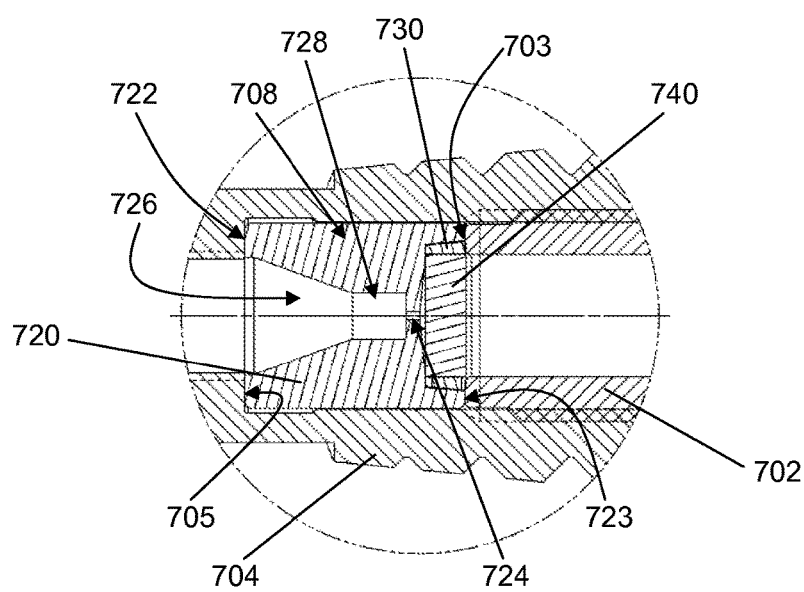
FIG. 7E is a detailed view of the chromatographic column of FIG. 7C showing the area within circle B in FIG. 7D.

As shown more clearly in FIG. 7E, the filter devices can include a housing 720, a compression element 730, and a porous element 400. The housing, compression element, and porous element can be configured according to the various embodiments discussed above with respect to FIGS. 1-6D. For example, the housing 720, compression element 730, and porous element 740 can be adapted or configured to be assembled to form the filter device 700.

The openings 712, 714 in the end fittings 704, 706 can be configured to receive the filter devices 708, 710 in a slip-fit relationship. For example, the outer diameter of the housing of the filter device can be slightly smaller than the inner diameter of the opening in the end fitting. As discussed above, a through-hole 724 can be formed in the bottom surface of the opening in the housing. The through-hole 724 communicates with a sealing cone 726. The sealing cone 726 can be configured to engage a sealing element, e.g., the ferrule of a compression fitting (not shown) that can be inserted through a second opening 713, 715 in the end fittings 704, 706. In the illustrated embodiment, a cylindrical portion 728 is disposed between the sealing cone 726 and the through-hole 724. The cylindrical portion 228 can, for example, receive a projecting portion of a fluid conduit disposed within the housing.

Referring to FIG. 7E, the end fittings can include a shoulder surface 705 configured to engage the filter device. For example, the shoulder surface 705 can contact a first end surface 722 of the housing 720 to couple the filter device 708 to an end of the column 702. In exemplary embodiments, the second filter device 710 can be coupled to the other end of the column 702 in a similar manner. A second end surface 723 of the housing 720 can contact an end surface 703 of the column body 702 when the filter device 710 is coupled to the column body by the end fitting. In some embodiments, the upper surface of the compression element 730 can provide a sealing surface that can engage an end surface 703 of the column body 702. The inner bore 703 of the column 702 can be in fluid communication with the through holes of the filter devices 708, 710 (e.g., the through hole 724 of the housing 720) via the porous elements (e.g., the porous element 740 of the filter device 708) when the filter devices 708, 710 are coupled to the column body 702 by the end fittings 704, 706.

Figure 8A:
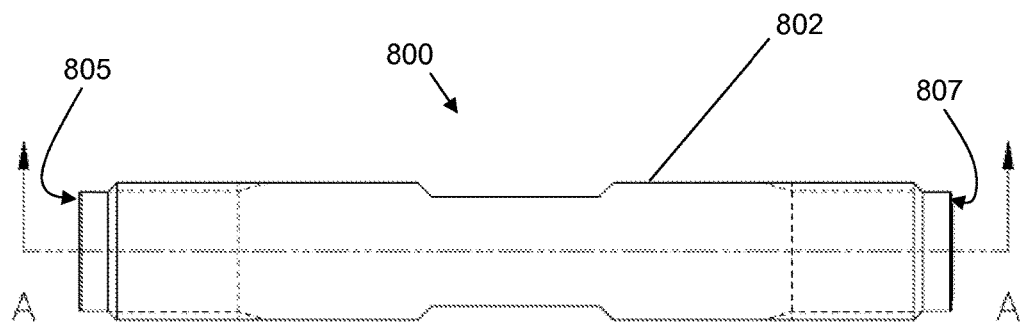
FIG. 8A is a side view of a chromatographic column according to another embodiment of the invention.
Figure 8B:
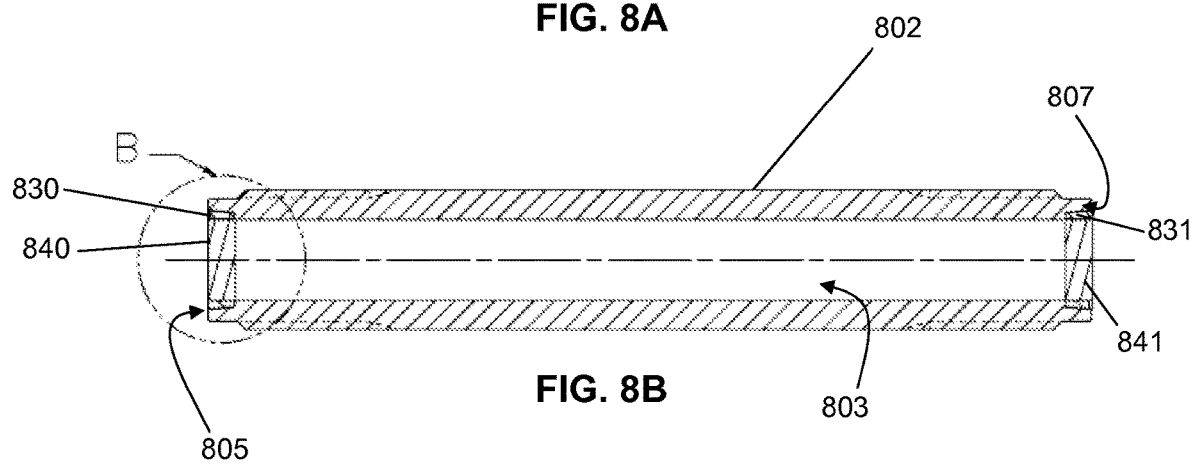
FIG. 8B is a cross-sectional view of the chromatographic column of FIG. 8A taken along line A-A in FIG. 8A.
Figure 8C:
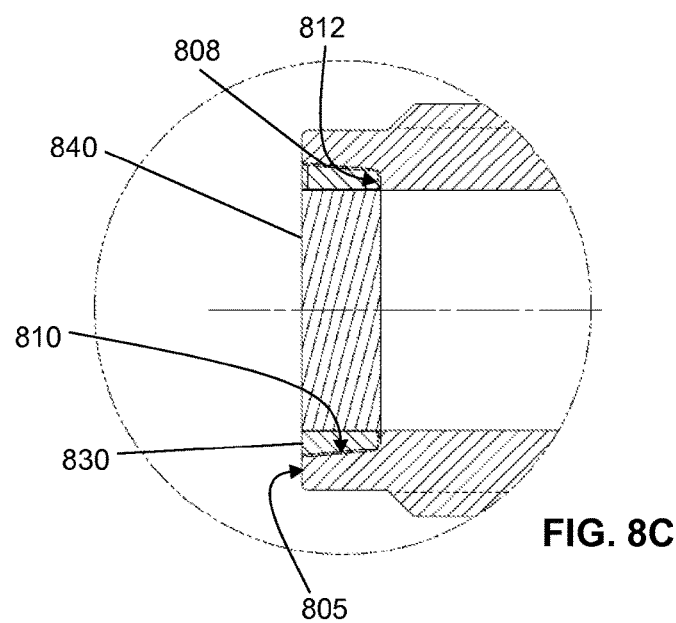
FIG. 8C is a detailed view of the chromatographic column of FIG. 8B showing the area within circle B in FIG. 8B.
Figure 9:
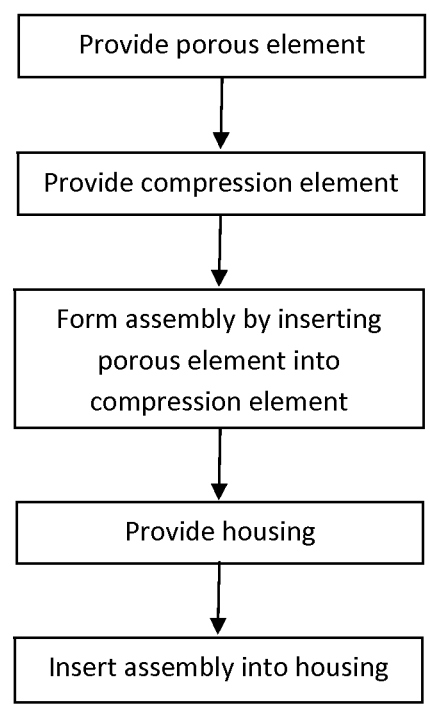
FIG. 9 is a flowchart of a method according to an embodiment of the invention.

In another embodiment, filter elements can received directly in an end of a column. For example, the end of the column can form a housing for a filter element. FIGS. 8A-8C illustrate an exemplary embodiment of a column 800 having a column body 802, a first end 805, a second end 807, and an inner bore 803. For example, the inner bore 803 can contain a packed bed of media. The column body 802 can be made of any substantially rigid material, such as plastic or metal. For example, the column body can be made from materials such as metals, metal alloys, or polymers. More specifically, the column body 802 can be made from a material such as stainless steel, brass, titanium, polyetheretherketone (PEEK), polyethylene, Hastaloy™, or polypropylene. In some embodiments, the column can be coupled to end fittings. For example, the end fittings can include threads that cooperate with threads on the column to couple to the end fittings to the column. The end fittings can include a sealing cone configured to engage a sealing element, e.g., the ferrule of a compression fitting that can be inserted therein. The end fittings can also include a cylindrical portion configured to receive a projecting portion of a fluid conduit disposed within the housing. In some embodiments, the column body and end fittings can each be made from the same material. In other embodiments, the column body 702 and end fittings 704, 706 can be made from different materials.

At least one end of the column body can include an opening 808 configured to receive a filter assembly. For example, the opening 808 can receive an assembly that includes a porous element 840 and a compression element 830. In some embodiments, the other end of the column body can include a second opening configured to receive another filter assembly. The second opening can receive a filter assembly that includes a porous element 841 and a compression element 831. The openings at the ends of the column body can be configured according to embodiments of the opening 208 in the housing 200, discussed in detail above. For example, the opening can be defined by a sidewall 810 and a bottom surface 812. In some embodiments, the bottom surface 812 can be a shoulder surface, e.g., as illustrated in FIG. 8C. In other embodiments, the bottom surface can be configured as discussed above with respect to FIGS. 2A-2D. For example, the bottom surface can surround a through-hole as shown in FIG. 2D.

The porous elements 840, 841 and compression elements 830, 831 can be configured according to the embodiments discussed above with respect to FIGS. 3A-5. For example, each compression element can receive the respective porous element in a slip-fit relationship. The assembly formed when a porous element is inserted into the compression element can be received by the respective opening in the end of the column body, e.g., in a press-fit relationship, as discussed above.

Method

The present invention also provides methods of assembling a filter. In one exemplary embodiment, the method can include providing a porous element, providing a compression element configured to receive the porous element, inserting the porous element into the compression element to form an assembly, providing a housing having an opening formed therein, the opening configured to receive the assembly, and inserting the assembly into the opening such that the assembly is retained therein, e.g., as shown in the flowchart of FIG. 7. The porous element can be the porous element 400 discussed in more detail above with respect to FIGS. 4-8C. The compression element can be the compression element 300 discussed in more detail above with respect to FIGS. 3A-3C and FIGS. 5-8C. The housing can be the housing 200 discussed above in more detail with respect to FIGS. 2A-2D and FIGS. 6A-8C.

As discussed above, the porous element 400 can be received in the compression element 300 in a slip-fit relationship. The step of inserting the porous element 400 into the compression element 300 can include sliding the porous element 400 into the opening defined by the inner circumferential surface 308 in the ring-shaped cylindrical body 302 of the compression element 300. Insertion of the porous element 400 into the compression element 300 can form an assembly 500, e.g., as illustrated in FIG. 5. In some embodiments, a slight frictional engagement can exist between the circumferential sidewall 406 of the porous element 400 and the inner circumferential surface 308 of the compression element 300 that can be sufficient to temporarily hold the porous element within the compression element prior to further assembly of those components into the housing 200.

As also discussed above, the assembly 500 can be received within the opening 208 in the housing 200. In exemplary embodiments, the assembly 500 can be received within the opening 208 in a press-fit relationship. The step of inserting the assembly 500 into the opening 208 in the housing 200 can include placing the assembly 500 at the opening 208 in the housing 200 and applying a force to the assembly 500 so as to drive the assembly into the opening 208. For example, a force can simultaneously be applied to the upper surface 402 of the porous element 400 and the upper surface 304 of the compression element 300 to push the assembly 500 into the opening 208. In some embodiments, a tool can be used to push the assembly 500 into the opening 208. In other embodiments, the assembly 500 can be pushed in the opening 208 manually.

The force applied to the assembly 500 can be sufficient to deform the compression element 300 as the outer circumferential surface 310 engages the sidewall 210 of the opening 208 in the housing 200. The deformation of the compression element 300 causes a corresponding reduction in diameter of the inner circumferential surface 308, which applies a compressive force to the circumferential sidewall 406 of the porous element 400. The compressive force between the inner circumferential surface 308 of the compression element and the circumferential sidewall 406 of the porous element 400 retains the porous element within the compression element 300. For example, an interaction between the inner circumferential wall of the opening and the outer circumferential surface of the compression element can convert the force applied to the assembly, e.g., the force applied to an upper surface of the assembly, into a radial force between the inner circumferential surface of the compression element and the outer surface of the porous element.

In exemplary embodiments, the force applied by the compression element 300 to the porous element 400 is sufficient to retain the porous element therein without damage to the porous element. In other exemplary embodiments, the force applied by the compression element 300 to the porous element 400 is sufficient to retain the porous element therein with minimal damage in the region of the circumferential sidewall 406 of the porous element.

Conventional sintered filters are maintained in a housing using an interference fit between the filter and a receiving bore in the mating portion of the housing. As the filter is pressed into the receiving bore, the interference can cause damage along the circumference and/or the face of the filter. For example, relative motion between the outer circumferential wall of the filter can damage the inner wall of the receiving bore can cause damage in the wall region. The pressure required to press-fit the filter in the receiving bore can also cause damage to the upper surface of the filter. The filter can also be deformed into a cup shape as it is pressed into the receiving bore, e.g., the center of the filter can move a greater distance than the outer wall of the filer due to the frictional interaction between the outer wall of the filter and the inner wall of the receiving bore.

Figure 10A:
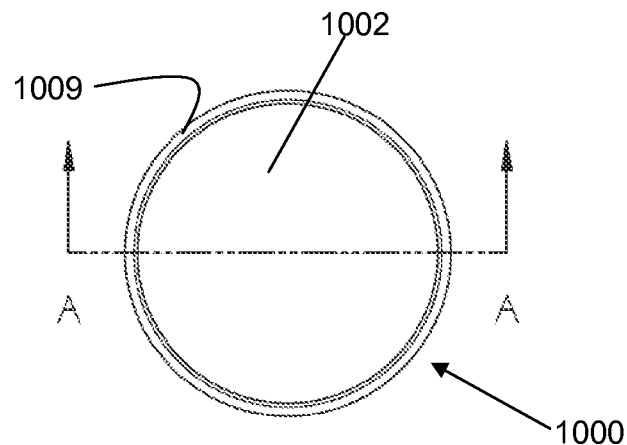
FIG. 10A is top view of a porous element.
Figure 10B:
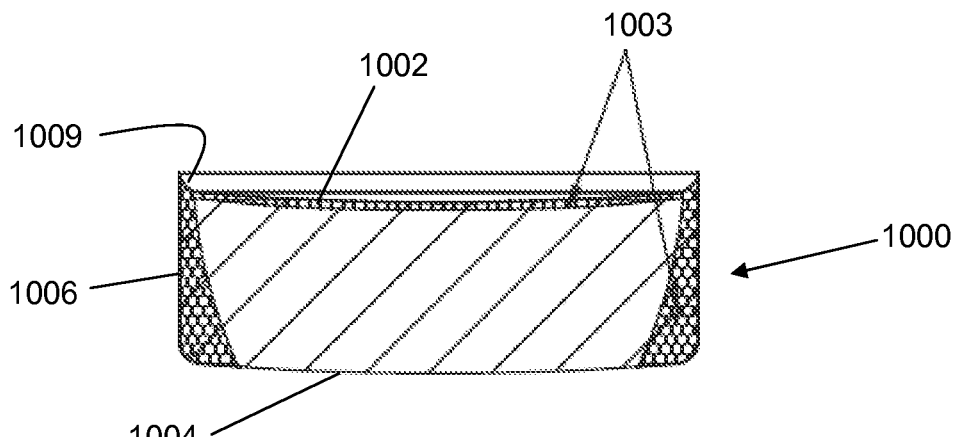
FIG. 10B is a cross-sectional view of the porous element of FIG. 9A taken along line A-A in FIG. 10A.

FIGS. 10A and 10B illustrate a conventional filter 1000 showing exemplary damage 1003 that can be caused when the filter is press-fit into a receiving bore. As shown, the upper surface 1002, circumferential sidewall 1006 and portions of the lower surface 1004 exhibit damage 1003. In the damaged regions, the pores of the filter can be crushed. Galling can also result from relative motion between the outer surface of the sidewall 1006 and the inner wall of the receiving bore. Friction between the contact surfaces can also cause deformation of the filter 1000 resulting in the cupping shown in FIG. 10B. For example, the upper surface 1002 and lower surface 1004 can be deformed to yield a curved cross-sectional profile as shown in FIG. 10B. Frictional engagement between the sidewall 1006 and the receiving bore can also cause the outer surface of the sidewall to remain stationary as the remainder of the filter is pushed into the receiving bore, forming a cupped outer portion 1009.

The damage and deformation to the filter can result in regions of the filter having undesirable flow characteristics. For example, damage to the filter can cause faster flow in the middle of the column than at the outer wall. These undesirable flow characteristics can cause excessive peak tailing, as well as other problems. Among other advantages, embodiments of the present invention can improve column efficiency and peak asymmetry in comparison to conventional filters that are press-fit into a receiving bore.

Figure 11A:
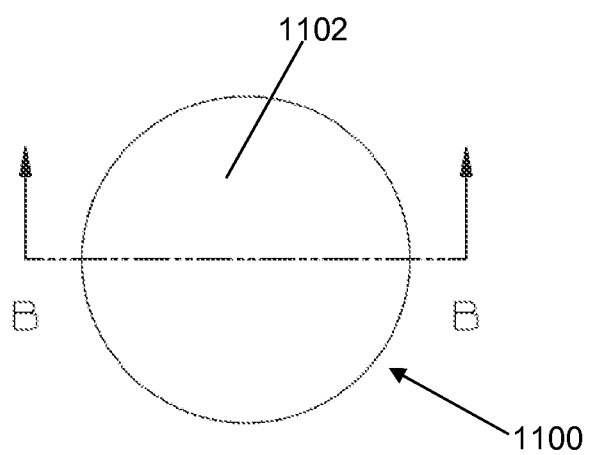
FIG. 11A is a top view of a porous element according to an embodiment of the invention.
Figure 11B:
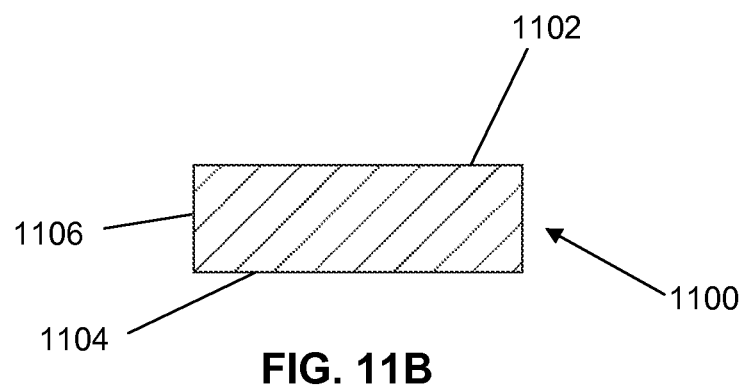
FIG. 11B is a cross-sectional view of the porous element of FIG. 11A taken along line B-B in FIG. 11A.

FIGS. 11A and 11B illustrate a porous element 1100 according to embodiments of the present invention. As shown, the porous element 1100 has a generally cylindrical body including an upper surface 1102, a lower surface 1104, and a circumferential sidewall 1106 intersecting the upper surface 402 and the lower surface 404. The porous element 1100 can have a porous structure including a plurality of void spaces. FIGS. 11A and 11B illustrate the porous element 1100 after assembly according to the methods and using the devices disclosed herein. Unlike the conventionally installed filter 1000 shown in FIGS. 10A and 10B, the porous element 1100 exhibits minimal damage to the sidewall 1106 and retains its shape. As a result, the flow characteristics of the porous element are maintained. For example, the porous element can have a uniform radial porosity when the assembly is retained within the housing. In some embodiments, the porosity of the upper surface of the porous element can be substantially the same as the porosity of the lower surface of the porous element when the assembly is retained within the housing.

One of ordinary skill in the art will appreciate further features and advantages of the invention based on the above-described embodiments. Accordingly, the invention is not to be limited by what has been particularly shown and described, except as indicated by the appended claims. All publications and references cited herein are expressly incorporated herein by reference in their entirety.

What is claimed is:

1. A filter comprising:
    a porous element including an outer surface having a side wall,
    a compression element having an inner surface surrounding the outer surface of the porous element and having an outer surface, the inner surface configured to receive the porous element in a slip-fit relationship, thereby forming an assembly, and
    a housing having an opening formed therein, the opening configured to receive and retain the assembly in a press-fit relationship, wherein when the opening receives the assembly in the press-fit relationship, a first force applied to the outer surface of the compression element is converted into a second force between the inner surface of the compression element and the outer surface of the porous element, so that the second force is sufficient to retain the porous element within the compression element.

2. The filter of claim 1, wherein the porous element has a uniform radial porosity when the assembly is retained within the housing.

3. The filter of claim 1, wherein the compression element comprises a cylindrical body having an upper surface, a lower surface, and wherein the inner surface is an inner circumferential surface and wherein the outer surface is an outer circumferential surface.

4. The filter of claim 3, wherein the outer circumferential surface of the cylindrical body has a first diameter at an intersection between the outer circumferential surface and the upper surface and a second diameter at an intersection between the outer circumferential surface and the lower surface, wherein the first diameter is greater than the second diameter.

5. The filter of claim 1, wherein the porous element comprises an upper surface, a lower surface, and wherein the sidewall is a circumferential sidewall intersecting the upper surface and the lower surface and wherein a porosity of the upper surface of the porous element is the same as a porosity of the lower surface of the porous element when the assembly is retained within the opening in the housing.

6. The filter of claim 1, wherein the opening in the housing comprises an inner circumferential sidewall, the inner circumferential sidewall comprising an upper edge and a lower edge and wherein the inner circumferential sidewall of the opening has a first diameter at an intersection between the inner circumferential sidewall and the upper edge and a second diameter at an intersection between the inner circumferential sidewall and the lower edge, wherein the first diameter is greater than the second diameter.

7. The filter of claim 1, wherein an upper surface of the compression element is flush with an upper edge of the opening in the housing when the assembly is retained within the housing.

8. The filter of claim 1, wherein an upper surface of the compression element extends beyond an upper edge of the opening in the housing when the assembly is retained within the housing.

9. The filter of claim 1, wherein the porous element comprises a frit.

10. The filter of claim 1, wherein the compression element comprises a polyetheretherketone ring.

11. The filter of claim 1, wherein the compression element includes a material selected from the group consisting of titanium, stainless steel, polyetheretherketone, polyethylene, and polypropylene.

12. A method of assembling a filter comprising:
    providing a porous element including an outer surface having a side wall;
    providing a compression element having an inner surface surrounding the outer surface of the porous element and having an outer surface, the inner surface configured to receive the porous element in a slip-fit relationship;
    inserting the porous element into the compression element to form an assembly;
    providing a housing having an opening formed therein, the opening configured to receive and retain the assembly in a press-fit relationship;
    inserting the assembly into the opening such that the assembly is retained therein and such that when the opening receives the assembly in the press-fit relationship, a first force applied to the outer surface of the compression element is converted to a second force between the inner surface of the compression element and the outer surface of the porous element, so that the force is sufficient to retain the porous element within the compression element.

13. The method of claim 12, wherein the compression element receives the porous element in the slip-fit relationship and the step of inserting the porous element into the compression element comprises slipping the porous element into the compression element and wherein the opening receives the assembly in the press-fit relationship and the step of inserting the assembly into the housing comprises pressing the assembly into the housing.

14. The method of claim 12, wherein the step of inserting the assembly into the opening comprises applying a force to the assembly, the force being sufficient to advance the assembly into the opening in the housing.

15. The method of claim 14, wherein the porous element and the compression element remain stationary relative to one another as the assembly is advanced into the opening in the housing.

16. The method of claim 14, wherein an interaction between an inner surface of the opening and an outer surface of the compression element converts the force applied to the assembly into a radial force between the inner surface of the compression element and the outer surface of the porous element.

17. The method of claim 12, wherein the porous element has a uniform radial porosity when the assembly is retained within the housing.

18. The method of claim 12, wherein a porosity of an upper surface of the porous element is the same as a porosity of a lower surface of the porous element when the assembly is retained within the housing.

* * * * *